United States Patent [19]

Berson

[11] Patent Number: 5,768,384

[45] Date of Patent: Jun. 16, 1998

[54] SYSTEM FOR IDENTIFYING AUTHENTICATING AND TRACKING MANUFACTURED ARTICLES

[75] Inventor: William Berson, Weston, Conn.

[73] Assignee: Pitney Bowes Inc., Stamford, Conn.

[21] Appl. No.: 623,078

[22] Filed: Mar. 28, 1996

[51] Int. Cl.$^6$ .................................................. H04L 9/00
[52] U.S. Cl. ........................ 380/23; 380/51; 705/11; 705/28
[58] Field of Search ................... 380/51, 23; 283/74; 705/11, 28, 29

[56] References Cited

U.S. PATENT DOCUMENTS

| | | |
|---|---|---|
| 5,384,846 | 1/1995 | Berson et al. |
| 5,420,924 | 5/1995 | Berson et al. |
| 5,426,700 | 6/1995 | Berson. |
| 5,592,561 | 1/1997 | Moore .................................. 380/51 X |
| 5,666,421 | 9/1997 | Pastor et al. ............................ 380/51 |

Primary Examiner—George M. Dombroske
Assistant Examiner—Joseph L. Felber
Attorney, Agent, or Firm—Ronald Reichman; Melvin J. Scolnick; Robert Meyer

[57] ABSTRACT

This invention relates to a system for identifying, authenticating and tracking articles of manufacture throughout their manufacturing and distribution channels. The foregoing system utilizes: manufacturing meters that are located at authorized manufacturing locations and produce encrypted data that is uniquely associated with each manufactured article; a printer located at the authorized manufacturing locations so that the printer will print the information encrypted by the meter, which encrypted information is affixed to the manufactured article; a data center coupled to the manufacturing meters and located at a site remote from the manufacturing meters; means for producing information that identifies the manufactured articles; and a plurality of means located where the authenticity of the manufactured articles are checked by comparing the encrypted information on the article with the information produced that identifies the article.

22 Claims, 3 Drawing Sheets

SYSTEM FOR IDENTIFYING AUTHENTICATING AND TRACKING MANUFACTURED ARTICLES

FIELD OF THE INVENTION

The invention relates generally to the field of authenticating the origin of manufactured articles. More particularly, it relates to a system for affixing information relating to the origin of manufactured articles and authenticating that the articles are the same manufactured articles that information has been affixed thereto.

BACKGROUND OF THE INVENTION

Bar codes have been used in a wide variety of applications as a source for information. Typically bar codes are used at a point-of-sale terminal in merchandising for pricing and inventory control. Bar codes are also used in controlling personnel access systems, mailing systems, and in manufacturing for work-in process and inventory control systems, etc. The bar codes themselves represent alphanumeric characters by series of adjacent strips of various widths, i.e. the universal product code.

A bar code is a set of binary numbers. It consists of black bars and white spaces. A wide black bar space signifies a one and a thin black bar or space signifies a zero. The binary numbers stand for decimal numbers or letters. There are several different kinds of bar codes. In each one, a number, letter or other character is formed by a certain number or bars and spaces.

Bar code reading systems or scanners have been developed to read bar codes. The bar code may be read by having a light beam translated across the bar code and a portion of the light illuminating the bar code is reflected and collected by a scanner. The intensity of the reflected light is proportional to the reflectance of the area illuminated by the light beam. Thus, the scanners read the difference between the light and dark bars by reading the absences of reflected light. This light is converted into an electric current signal and then the signal is decoded.

Bar codes have been affixed to many different types of documents and articles, so that they may be read by a machine, thereby reducing labor costs. Documents that include bar codes have been issued by governmental agencies, financial institutions, brokerage houses, etc., that authorize the holder of such documents to perform authorized tasks or grant rights to the holder of such a document. Examples of such documents are drivers licenses, entry access badges, identification cards, etc. Articles that include bar codes have been issued by many different types of manufactures and processors for inventory control.

Currently, United States Companies are victimized by a crime called export diversion. Diverters buy premium trademarked articles, at deeply discounted prices that are intended for orders bound for untapped foreign markets. During shipment, the articles are returned to the United States at foreign ports and illegally resold to dealers and retailers in the United States for a sizable profit. Hence, depriving the original manufacture of domestic sales.

The problem of identifying the origin of articles may extend to a very broad class of articles and other objects. Thus, it may be desirable to establish that particular articles or items have been inspected, or passed through customs, or were produced by a particular company. Similarly, it may be desirable to have secure evidence of the origin of a component of manufactured articles.

Another problem of the prior art is that famous brand manufactures are losing sales and having there reputation tarnished by unscrupulous manufactures who make and sell inferior manufactured articles bearing the famous manufactures brand name to unsuspecting consumers.

Manufactures who do not have the manufacturing capacity to produce their entire product, often subcontract the production of components of the product or the entire product to other manufactures. Sometimes, the subcontractor produces a different quantity of the articles that was contracted for and sells the additionally produced articles through unauthorized channels. When the above happens the manufacturer lacking manufacturing capacity is deprived of lost sales.

An additional problem of the prior art is that there is a need to track manufactured articles from the moment and point of the articles manufacture to the moment and point of the sale of the articles. Articles are manufactured in a multitude of international locations and distributed through many distribution channels. Thus, it is difficult to maintain a central data base that contains all of the needed or wanted information that is associated with the articles.

SUMMARY OF THE INVENTION

This invention overcomes the disadvantages of the prior art by providing a system for identifying, authenticating and tracking articles of manufacture or manufactured goods throughout their manufacturing and distribution channels. The foregoing system utilizes: manufacturing meters that are located at authorized manufacturing locations and produce encrypted data that is uniquely associated with each manufactured article; a printer located at the authorized manufacturing locations so that the printer will print the information encrypted by the meter, which encrypted information is affixed to the manufactured article; a data center coupled to the manufacturing meters and located at a site remote from the manufacturing meters; means for producing information that identifies the manufactured articles; and a plurality of means located where the authenticity of the manufactured articles are checked by comparing the encrypted information on the article with the information produced that identifies the article.

Manufacturing meters are used to create unique encrypted labels or tags which are associated with and affixed to the manufactured article from the moment the article is manufactured. The label or tag contains a time stamp and some identification of the manufactured article. The manufactured article may be identified by the following manufacturing information: the location in which the article was manufactured; the machine that produced the article; the person who operated the machine that produced the article; and the serial number of the article, etc. The manufactured article may also be identified by having information that may be used downstream in the distribution chain. For instance, the customs rating code, and shipping manifest data. The manufacturing and distribution chain information is encrypted and/or secured with a digital signature and printed as a code on the aforementioned label or tag. The code may be encrypted and be visible or invisible to the unaided human eye. The data center is in periodic communication with the manufacturing meters and is used to distribute encryption certificates to the manufacturing meters, record the forensic integrity of the manufacturing meters and log the usage of the manufacturing meters. The scanners are used to read and determine the authenticity of the information printed on the tags or labels.

DETAILED DESCRIPTION OF THE PREFERRED EMBODIMENT

Figure 1:
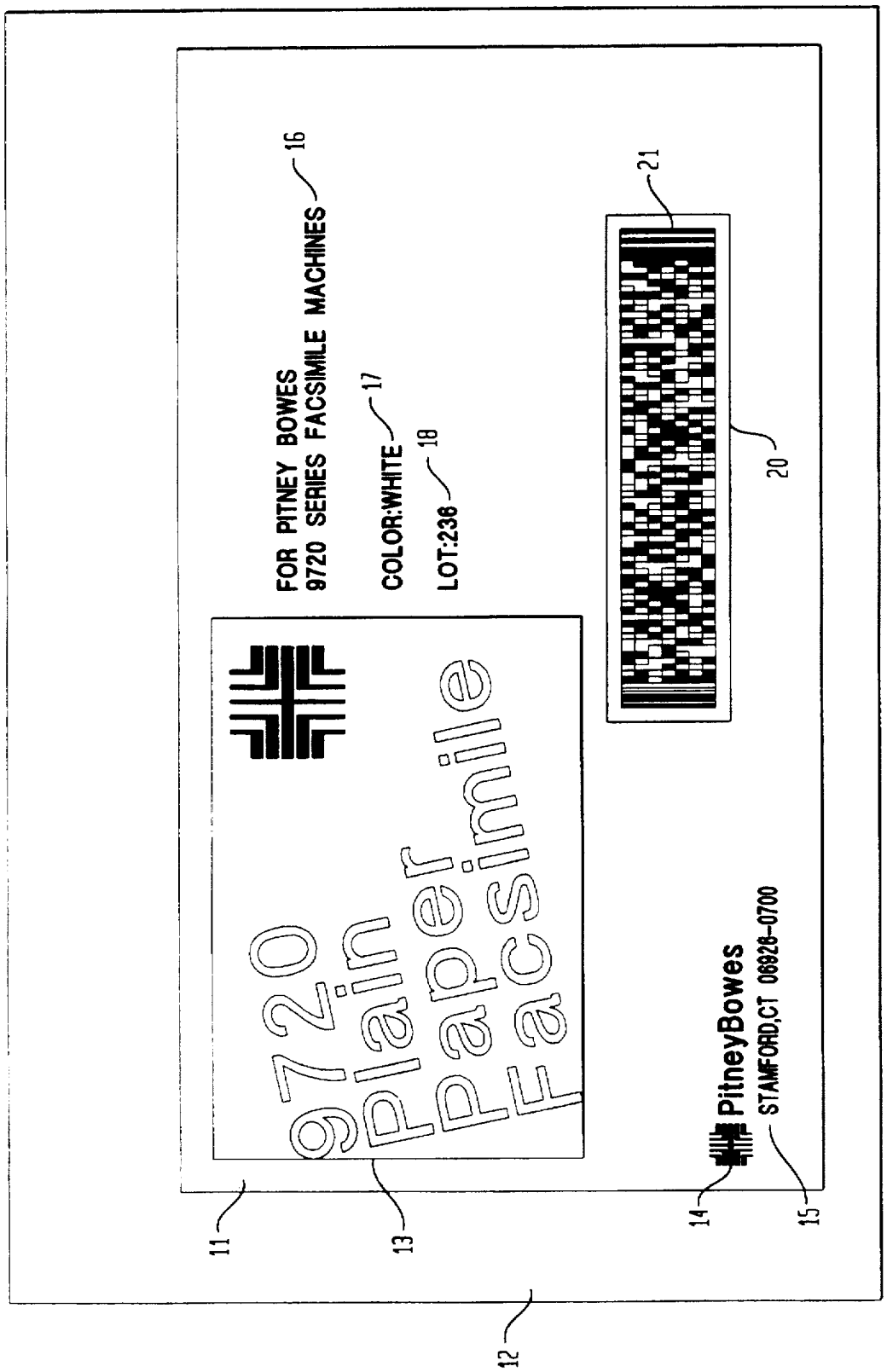
FIG. 1 is a drawing of a label that is affixed to manufactured articles.

Referring now to the drawings in detail and more particularly to FIG. 1, the reference character 11 represents a sticker that is affixed to box 12. Box 12 contains articles. The type of articles contained in box 12, is 9720 Plain Paper Facsimile 13. The distributor of the articles is shown at 14, the city in which the distributor is located at 15, the type of equipment for which the articles may be used at 16, the color of the articles 17 and the lot number of the articles 18. A label 20 containing an encrypted bar code or a normal bar code 21, that is developed by some or all of the information contained on sticker 11, is affixed to sticker 11. It will be obvious to one skilled in the art that bar code 21 may be printed with an ink that is visible or invisible to the unaided human eye.

Figure 2:
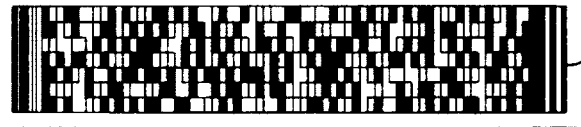
FIG. 2 is a drawing of a order form 26 for manufactured articles.

FIG. 2 is a drawing of a order form 26 that may be used to order manufactured articles. The serial number 27 of order form 26 of company 28 is dated at 29, transmitted to 30, by 31, regarding parts and supplies order request 32. The supply items# are indicated in column 33, the part numbers in column 34, the quantities ordered in column 35 and a description of the manufactured articles in column 36. The person requesting the manufactured articles is indicated at 37 and their address and telephone at 38. Information regarding the ordering of 9720 plain white facsimile paper is entered in columns 33, 34, 35 and 36. A label 9 containing an encrypted bar code or a normal bar code 8, that is developed by some or all of the information contained on order form 26, is affixed to order form 26. It will be obvious to one skilled in the art that bar code 8 may be printed with an ink that is visible or invisible to the unaided human eye. It will also be obvious to one skilled in the art that various other forms i.e., customs forms, shipping manifests, production forms, etc. may be used to replace form 26. Any of the above mentioned forms may be stored in any tangible medium of expression i.e., computer memory, diskettes, paper, etc.

Figure 3:
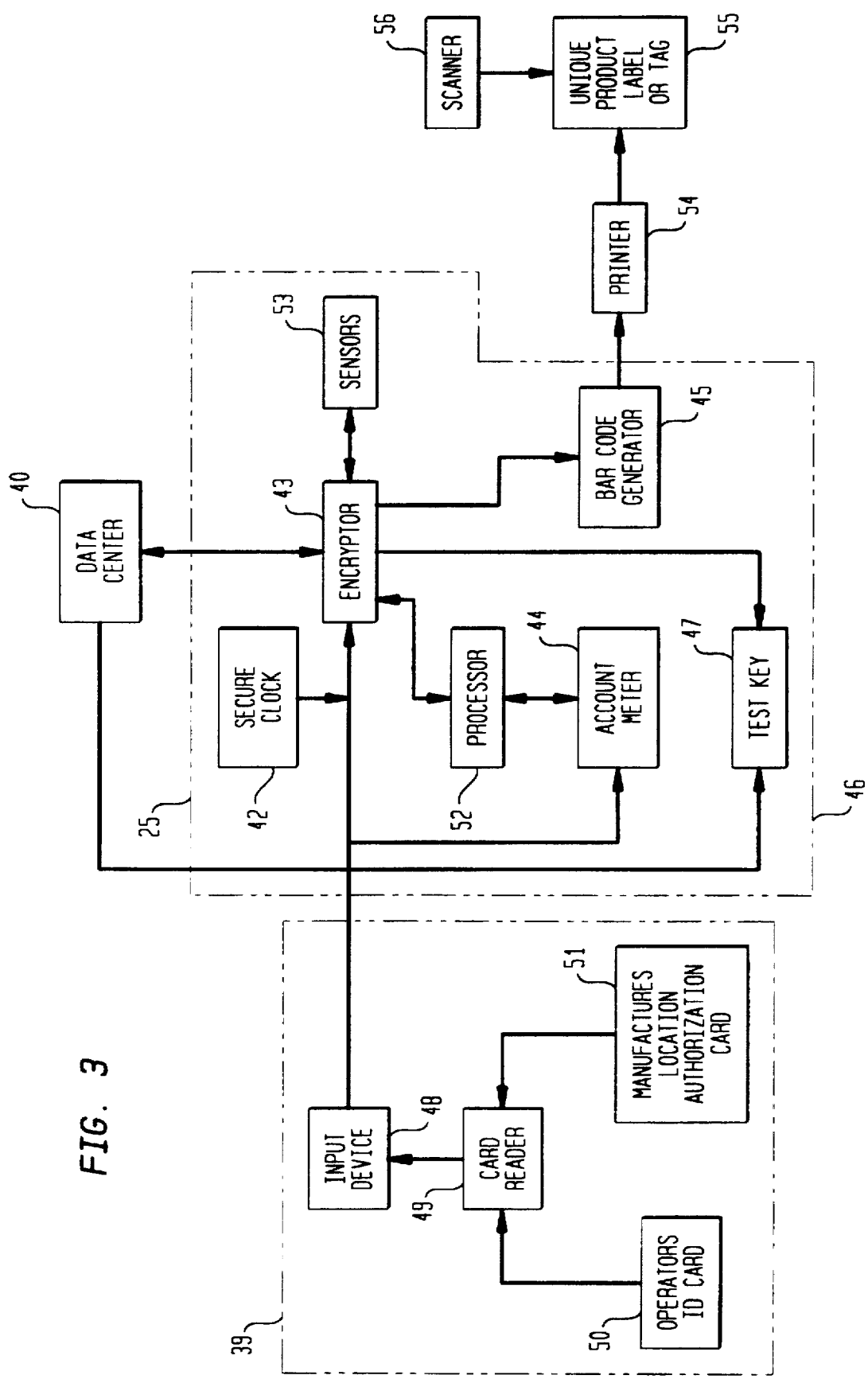
FIG. 3 is a block diagram showing the interaction of the manufacturing meter, manufacturing information input device data center and scanner of the apparatus of this invention.

FIG. 3 is a block diagram showing the interaction of manufacturing meter 25, manufacturing information input device 39, data center 40 and scanner 56 of the apparatus of this invention. The components of manufacturing meter 25 are contained in a secure box 46, that includes physical interlocks or sensors 53 that prevent unauthorized personnel from tampering with the components of meter 25. Sensors 53 communicate with data center 40 via encryptor 43. An example of box 46 is the Veritas™ Authenticator manufactured by Pitney Bowes of Shelton, Conn. 06484.

Manufacturing meter 25 includes: a secure clock 42, that indicates the time information was inputted by device 48 to meter 25; a encryptor 43, that is coupled to clock 42; an account meter 44 that includes an ascending register and a descending register, that are coupled to encryptor 43, a bar code generator 45, that is coupled to encryptor 43; a processor 52 that is coupled to account meter 44 and encryptor 43, and a test key 47, that is coupled to data center 40 and encryptor 43.

Manufacturing information input device 39 includes: an input device 48, that is coupled to clock 42, encryptor 43 and account meter 44 of manufacturing meter 25; a card reader 49 that is coupled to input device 48; an operators identification card 50 that is read by reader 49; and a manufactures location authorization card 51 that is read by reader 49. Card 50 may be a card that has a bar code or other code affixed thereto that contains information about the person who is operating the equipment that is producing the manufactured article. The information encoded in card 50 may be the name, social security number, age, height, weight, color of eyes, etc. of the operator of the equipment that is producing the manufactured article. Card 51 may be a card that has a bar code or other code affixed thereto that contains information about the manufacturer who owns, leases, or rents the equipment that is producing the manufactured article. The information encoded in card 51 may be the name, tax identifying number, location of the main office, etc. of the manufacturer that is producing the manufactured article. Input device 48 may be used to inform meter 25 of the serial number of the machine or machines producing the manufactured article, the location of the machine or machines producing the manufactured article; and/or a description of the components that are used to produce the manufactured article, etc.

Periodically, manufacturing meter 25 is inspected by the enabling of test key 47. Test key 47 may be a physical key or a signal from data center 40 and/or an encrypted signal from encryptor 43.

The ascending register will maintain a record of all the labels or tags produced by meter 25 and the descending register maintains a record of the number of labels or tags that have been authorized by data center 40 to be printed. The descending register is loaded by data center 40 with a pre-determined number of manufactures of articles or permissions to produce a given number of articles, each of which represents the authorization to manufacture a single article.

In operation encryptor 43 and processor 52 will be programmed with an encryption algorithm, as is known in the art. Reference can be had to U.S. Pat. No. 4,853,961, 5,073,935 and 5,142,577, herein incorporated by reference wherein suitable encryption schemes are disclosed. In addition, a standard encryption scheme, such as the RSA encryption technique, can also be used for the programming of processor 52.

Bar code generator 45 will encode the information received from encryptor 43 to create a unique encrypted bar code that is associated with the article that was manufactured. Generator 45 is coupled to printer 54, which is located at the site that produced the manufactured article. Generator 45 will cause printer 54 to print a unique bar code on a product label or tag 55. The aforementioned bar code may be visible or invisible to the unaided human eye. Label or tag 55 is affixed to the manufactured article. The aforementioned bar code on tag 55 contains encrypted or digitally signed data files representing information that is unique to the article manufactured.

In order to ascertain if the article manufactured that has tag 55 affixed thereto is genuine and not diverted from its intended logistics channel, the bar code on tag 55 is scanned by scanner 56. The encrypted information contained in the bar code printed on tag 55 is retrieved and then compared against information retrieved from the scan of associated documents. For instance, scanner 56 may scan the information contained in invoice 26. It will be obvious to one skilled in the art that many different associates documents pertaining to the manufactured article may be scanned by scanner

56. If the scanned information on tag 55 matches or is correctly related to the scanned information on invoice 26 the manufactured article is in the correct distribution channel and the article is genuine. If, for example the scanned article is genuine, but the scanned article does not belong to the articles covered by invoice 26, then the manufactured article is a forgery or diverted genuine article.

The above specification describes a new and improved system for identifying, authenticating and tracking articles of manufacture throughout their manufacturing and distribution channels. It is realized that the above description may indicate to those skilled in the art additional ways in which the principles of this invention may be used without departing from the spirit. It is, therefore, intended that this invention be limited only by the scope of the appended claims.

What is claimed is:

1. A system for identifying, authenticating and tracking articles of manufacture, said system comprising:

one or more manufacturing meters that are located at authorized manufacturing location, said meters produce encrypted information that is uniquely associated with each manufactured article and the operator of the equipment that produced the manufactured article;

one or more printers located at the authorized manufacturing locations wherein each of said printers is coupled to one of said manufacturing meters, that is located at the same location as said printer, so that said printers print the information encrypted by said meters, which encrypted information is affixed to the manufactured article;

means for producing information that is used to identify the manufactured article; and means for identifying the authenticity of the manufactured articles by comparing the encrypted information printed on the article with the information produced by said producing means.

2. The system claimed in claim 1, further including:

a data center coupled to the manufacturing meters and located at a site remote from the manufacturing meters, said data center determines the number of manufactured articles in which encrypted information may be affixed.

3. The system claimed in claim 2, wherein said manufacturing meter further comprises:

an ascending register that maintains a record of the number of articles for which encrypted information has been produced; and a descending register that maintains a record of the number of articles which encrypted information has been authorized to be printed by said data center.

4. The system claimed in claim 2, wherein the data center is in periodic communication with said manufacturing meters to record the forensic integrity of said manufacturing meters.

5. The system claimed in claim 1, wherein the information encrypted by said meter contains a time stamp that identifies the time the manufactured article was produced.

6. The system claimed in claim 1, wherein the information encrypted by said meter includes the location in which the article was manufactured.

7. The system claimed in claim 1, wherein the information encrypted by said meter includes the machine that produced the article.

8. The system claimed in claim 1, wherein the information encrypted by said meter includes the name of the person who operated the machine that produced the article.

9. The system claimed in claim 1, wherein the information encrypted by said meter includes the serial number of the article.

10. The system claimed in claim 1, wherein the information printed by said printer may be invisible to the unaided human eye.

11. The system claimed in claim 1, wherein the information produced by said means for producing information includes shipping manifest data.

12. The system claimed in claim 1, wherein the information produced by said means for producing information includes information obtained from forms that contain information relating to the manufactured article.

13. The system claimed in claim 1, wherein said means for producing information produces encrypted information.

14. The system claimed in claim 13, wherein the encrypted information may be invisible or invisible to the unaided human eye.

15. The system claimed in claim 1, wherein said means for identifying the authenticity of the manufactured articles are scanners.

16. The system claimed in claim 1, wherein the information encrypted by said meter includes the social security number of the person who operated the machine that produced the article.

17. The system claimed in claim 16, wherein the information encrypted by said meter includes the age of the person who operated the machine that produced the article.

18. The system claimed in claim 17, wherein the information encrypted by said meter includes the color of the eyes of the person who operated the machine that produced the article.

19. A method for determining if a manufactured article is the same article described in a medium of expression, comprising the steps of:

a. producing encrypted data on a manufactured article that is uniquely associated with the manufactured article and the operator of the equipment that produced the manufactured article;

b. producing information pertaining to the manufactured article on a medium of expression;

c. encrypting at least a portion of the produced information on a medium of expression;

d. placing at least a portion of the encrypted information derived in step c on the medium of expression;

e. comparing the information encrypted on the manufactured article with the information encrypted on the medium of expression;

f. determining if the information in step e compares in order to authentic the article.

20. The method of claim 19, further including the steps of:

determining the number of manufactured articles in which encrypted information may be affixed.

21. The method of claim 19, wherein step c further includes the step of:

printing a bar code on the medium of expression.

22. The method of claim 21, wherein the code is printed with an invisible ink.

* * * * *